United States Patent Office 2,906,754
Patented Sept. 29, 1959

2,906,754
UNSYMMETRICAL-1,4-PIPERAZINES

John J. D'Amico, Nitro, W. Va., assignor to Monsanto Chemical Company, St. Louis, Mo., a corporation of Delaware No Drawing. Application December 28, 1956
Serial No. 631,040

6 Claims. (Cl. 260—268)

The present invention relates to new chemical products as well as to means of obtaining such products and to the use of said products as accelerators of the vulcanization of rubber. More particularly, the invention relates to new unsymmetrical-1,4-substituted piperazines containing in one position a thiazolylmercapto radical and in the other position an aryl, alkyl or aralkyl radical, and to the use as disclosed of such products.

The preferred class of compounds most conveniently may be represented by the general formula

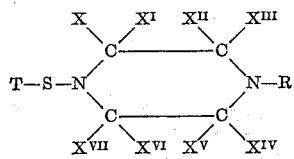

wherein T represents a thiazolyl group, R represents alkyl, aryl, aralkyl, and alkoxy or halogen substituted derivatives thereof and X, $X^I$, $X^{II}$, $X^{III}$, $X^{IV}$, $X^V$, $X^{VI}$ and $X^{VII}$ represent hydrogen or lower alkyl, at least four being hydrogen.

These compounds may be obtained by oxidative condensation of a mono N-substituted piperazine and a mercaptothiazole. The required piperazines are for the most part known compounds and in any case are derivable by known procedures. Examples of the new compounds comprise 1 - (2 - benzothiazolylmercapto) - 4 - phenyl - 2 - methylpiperazine, 1 - (2 - benzothiazolylmercapto) - 4 - phenyl - 2,5 - dimethylpiperazine, 1 - (2 - benzothiazolylmercapto - 4 - phenyl - 2,3 - dimethylpiperazine, 1 - (2 - benzothiazolylmercapto) - 4 - methyl - 2,3 - diethylpiperazine, 1 - (benzothiazolylmercapto) - 4 - ethyl - 2,2 - dimethylpiperazine, 1 - (2 - benzothiazolylmercapto) - 4 - phenyl - 2 - ethylpiperazine, 1 - (2 - benzothiazolylmercapto) - 4 - methyl - 2,2,3 - trimethylpiperazine, 1 - (2 - benzothiazolylmercapto) - 4 - methyl - 2,2 - dimethyl - 3 - ethylpiperazine, 1 - (2 - benzothiazolylmercapto) - 4 - methyl - 2,2,3,3 - tetramethylpiperazine, 1 - (2 - benzothiazolylmercapto) - 4 - phenylpiperazine, 1 - (2 - benzothiazolylmercapto) - 4 - methylpiperazine, 1 - (2 - benzothiazolylmercapto) - 4 - ethylpiperazine, 1 - (2 - benzothiazolylmercapto) - 4 - isopropylpiperazine, 1 - (2 - benzothiazolylmercapto) - 4 - benzylpiperazine, 1 - (2 - benzothiazolylmercapto) - 4 - phenethylpiperazine, 1 - (2 - benzothiazolylmercapto)-4-p-methylbenzylpiperazine, 1 - (2 - benzothiazolylmercapto) - 4 - p - isopropylbenzylpiperazine, 1 - (2 - benzothiazolylmercapto) - 4 - p - chlorobenzylpiperazine, 1 - (2 - benzothiazolylmercapto) - 4 - beta - naphthylmethylpiperazine, 1 - (2 - benzothiazolylmercapto) - 4 - p - methoxybenzylpiperazine, 1 - (2 - benzothiazolylmercapto) - 4 - octylpiperazine, 1 - (2 - benzothiazolylmercapto) - 4 - dodecylpiperazine, 1 - (2 - benzothiazolylmercapto) - 4 - o - tolylpiperazine, 1 - (2 - benzothiazolylmercapto) - 4 - beta - naphthylpiperazine, 1 - (2 - benzothiazolylmercapto) - 4 - alpha - naphthylpiperazine, 1 - (2 - benzothiazolylmercapto) - 4 - p - bromophenylpiperazine, 1 - (2 - benzothiazolylmercapto) - 4 - o - methoxyphenylpiperazine and 1 - (2 - benzothiazolylmercapto) - 4 - p - methoxyphenylpiperazine. It is understood and is quite apparent that in place of 2-benthiazolylmercapto other thiazolylmercapto radicals may be substituted, as for example substituted derivatives where the substituents comprise nitro, phenyl, lower alkoxy and lower alkyl radicals.

The preparation of the new compounds will be understood from the typical examples that follow.

EXAMPLE 1—PRODUCT A

*1-(2-benzothiazolylmercapto)-4-phenylpiperazine*

A solution was prepared containing 13.9% by weight of 2-mercaptobenzothiazole in the form of the sodium salt thereof. To 300 parts of this solution (0.25 mole of MBT) there were slowly added 61 parts (0.375 mole) of N-phenylpiperazine while maintaining the temperature of the mass between 20–25° C. and while agitating constantly. Thereupon 59 parts (0.15 mole) of 25% sulfuric acid were slowly added while maintaining the temperature at the limits stated. There were then slowly added at 45–50° C. 22.35 parts (0.30 mole) of sodium hypochlorite in the form of 155 ml. of solution containing 14.47 parts hypochlorite per 100 ml. After the addition of all the hypochlorite, the temperature was maintained at 45–50° C. while agitating for approximately an hour. Unreacted oxidizing agent was then destroyed by the addition of approximately 2 parts of sodium sulfite and the mass then cooled to about 25° C. by the addition of water. The insoluble product was thereupon collected by filtration, washed with water until the washings were neutral in reaction and air-dried at 50° C. The product, M.P. 163–165° C. after recrystallization from ethyl acetate, was obtained in 99% yield. The product was soluble in acetone and chloroform, slightly soluble in benzene and ethyl acetate and insoluble in water, ether, ethanol and heptane. Identification of the product as that expected and named above, namely $$C_{17}H_{17}N_3S_2$$

was confirmed by analysis which produced as results:

|  | Percent Theory | Percent Found |
|---|---|---|
| nitrogen | 12.83 | 13.05 |
| sulfur | 19.58 | 19.43 |

EXAMPLE 2—PRODUCT B

*1-(5-chloro-2-benzothiazolylmercapto)-4-phenylpiperazine*

Proceeding as described in the preceding example except that the solution of the thiazolylmercapto compound was prepared by dissolving 50.4 parts (0.25 mole) of 5-chloromercaptobenzothiazole in 100 parts of water containing 40 parts (0.25 mole) of 25% sodium hydroxide solution. The solution was clarified by filtration and was then employed with the other reactants in the manner already described in detail. The yield obtained was 97.5%. The product, after recrystallization from benzene, was a light tan colored solid melting at 184–185° C., was soluble in hot benzene and chloroform, slightly soluble in hot acetone and insoluble in water, ether, heptane, ethanol and ethyl acetate. Confirmation of the product as that named at the start of this example and having the empirical formula $C_{17}H_{16}ClN_3S_2$ was completed by analysis which yielded the following results:

|  | Percent Theory | Percent Found |
|---|---|---|
| nitrogen | 11.61 | 11.57 |
| sulfur | 17.72 | 17.72 |

EXAMPLE 3—PRODUCT C

1-(4,5-dimethyl-2-thiazolylmercapto)-4-phenylpiperazine

As another example of the invention, a solution was prepared containing 36.2 parts (0.25 mole) of 4,5-dimethyl-2-thiazolethiol dissolved in 50 parts of water containing 40 parts (0.25 mole) of 25% sodium hydroxide solution. Proceeding again with the same quantities of N-phenylpiperazine, acid, hypochlorite, and sodium sulfite as set forth in Example 1 hereof, the same procedure was followed except that the addition of hypochlorite and agitation therewith proceeded at a temperature of 25–30° C. and instead of obtaining a solid product at the completion of the reaction, the entire mass was cooled and treated with ether, the ether extract was separated, washed with water until the wash water was neutral to litmus and the ether was removed in vacuo. An amber colored semi-solid product was obtained which was insoluble in water but soluble in the common organic solvents.

EXAMPLE 4—PRODUCT D

1-(2-benzothiazolylmercapto)-4-benzylpiperazine

A solution was prepared by mixing 43 parts (0.25 mole) of 97% mercaptobenzothiazole, 25 parts of water and 40 parts (0.25 mole) of 25% aqueous sodium hydroxide. The solution was stirred while adding to it 110 parts (0.625 mole) of N-benzylpiperazine and then stirred for about 15 minutes. Over a period of about 15 minutes 49.5 parts by weight of 25% sulfuric acid was added and the solution stirred for another 15 minutes. Then 0.3 mole of sodium hypochlorite in the form of an aqueous solution containing 16.1 grams NaOCl per 100 ml. was added at 45–50° C. over a period of one and one-half hours. The stirred reaction mixture was held at 45–50° C. for one hour longer and 4 parts of sodium sulfite added after cooling to 25° C. The stirred reaction mixture was extracted with ethyl ether, the ether extracts washed with water and dried. After removing the ether in vacuo a solid remained which was air-dried on a porous plate at 25–30° C. The product after recrystallizing from ethyl alcohol melted at 61–63° C. It contained 12.0% nitrogen and 18.2% sulfur compared to 12.3% nitrogen and 18.8% sulfur calculated for $C_{18}H_{19}N_3S_2$.

The action as rubber vulcanization accelerators of the sulfenamides of the type set forth in the foregoing examples are described in the following typical results wherein a rubber-black tread formulation was employed. The rubber stocks were obtained in the well known manner from the following recipes in which parts by weight are indicated:

| Smoked sheets rubber | 100.0 |
|---|---|
| Carbon black (Philblack O) | 50.0 |
| Zinc oxide | 5.0 |
| Stearic acid | 2.0 |
| Saturated hydrocarbon softener | 3.0 |
| Sulfur | 2.5 |

To the above there were added in separate stocks

| Product A | Product B | Product C |
|---|---|---|
| 0.5 | 0.5 | 0.5 |

Vulcanization was completed at a temperature of 144° C. and the following results obtained on the stocks:

|  | Product A | Product B | Product C |
|---|---|---|---|
| Modulus of elasticity at 300% elongation | 2,030 | 1,803 | 2,036 |
| Tensile strength at break | 3,730 | 3,270 | 3,616 |
| Mooney scorch at 121° C | 21 | 21 | 15 |

The results indicate that the products of the present invention display activity as vulcanization accelerators typical of the class of sulfenamide products. The products themselves, as was shown in the examples, are easy to prepare, are relatively economical to obtain, possess good physical properties and also were found to exhibit good handling properties in rubber stocks and to show good stability on long continued storage.

It is intended to cover all changes and modifications of the examples of the invention herein chosen for purposes of disclosure which do not constitute departures from the spirit and scope of the invention.

What is claimed is:

1. As a new product a compound having the structure

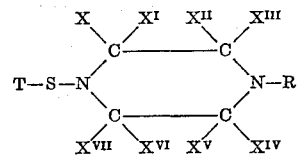

wherein T is a thiazolyl radical selected from the group consisting of lower alkyl substituted thiazolyl, benzothiazolyl and nitro-, chloro-, phenyl-, lower alkoxy- and lower allyl-substituted benzothiazolyl, R is selected from the group consisting of alkyl of 1–12 carbon atoms, aryl and aryl substituted lower alkyl, the aryl radicals being selected from the group consisting of phenyl, tolyl, naphthyl, lower alkoxy substituted phenyl and middle halogen substituted phenyl, and X, $X^I$, $X^{II}$, $X^{III}$, $X^{IV}$, $X^V$, $X^{VI}$ and $X^{VII}$ are selected from the group consisting of hydrogen and lower alkyl at least four being hydrogen.

2. As a new product a compound having the structure

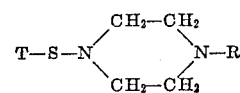

wherein T represents benzothiazolyl and R represents a lower alkyl radical.

3. As a new product 1-(2-benzothiazolylmercapto)-4-phenylpiperazine.

4. As a new product 1-(4,5-dimethyl-2-thiazolylmercapto)-4-phenylpiperazine.

5. As a new product 1-(5-chloro-2-benzothiazolylmercapto)-4-phenylpiperazine.

6. As a new product 1-(2-benzothiazolylmercapto)-4-benzylpiperazine.

References Cited in the file of this patent

UNITED STATES PATENTS

| 2,284,576 | Jones | May 26, 1942 |
|---|---|---|
| 2,514,181 | Smith | July 4, 1950 |
| 2,560,032 | Smith | July 10, 1951 |
| 2,704,761 | D'Amico | Mar. 22, 1955 |
| 2,766,237 | D'Amico | Oct. 9, 1956 |
| 2,768,988 | Christensen | Oct. 30, 1956 |

FOREIGN PATENTS

| 575,074 | Great Britain | Feb. 1, 1946 |
|---|---|---|